United States Patent
Puglia

(10) Patent No.: US 12,179,154 B2
(45) Date of Patent: Dec. 31, 2024

(54) FEATURES ON A POROUS MEMBRANE

(71) Applicant: ENTEGRIS, Inc., Billerica, MA (US)

(72) Inventor: John Paul Puglia, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 451 days.

(21) Appl. No.: 15/777,519

(22) PCT Filed: Nov. 16, 2016

(86) PCT No.: PCT/US2016/062184
§ 371 (c)(1),
(2) Date: May 18, 2018

(87) PCT Pub. No.: WO2017/087461
PCT Pub. Date: May 26, 2017

(65) Prior Publication Data
US 2018/0333679 A1    Nov. 22, 2018

Related U.S. Application Data

(60) Provisional application No. 62/257,355, filed on Nov. 19, 2015, provisional application No. 62/257,359, filed on Nov. 19, 2015.

(51) Int. Cl.
*B01D 63/06*    (2006.01)
*B01D 67/00*    (2006.01)
(Continued)

(52) U.S. Cl.
CPC ....... *B01D 63/067* (2013.01); *B01D 67/0088* (2013.01); *B01D 69/02* (2013.01);
(Continued)

(58) Field of Classification Search
CPC .. B01D 63/067; B01D 67/0088; B01D 69/02; B01D 2201/127; B01D 2313/40;
(Continued)

(56) References Cited

U.S. PATENT DOCUMENTS 3,960,730 A    6/1976   Miller, III
4,944,877 A *  7/1990   Maples ................. B01D 63/10
                                                        210/321.74
(Continued)

FOREIGN PATENT DOCUMENTS

CA    1214114 A    11/1986
CN    1819866 A    8/2006
(Continued)

OTHER PUBLICATIONS

Lee Jian-Yuan et al., The potential to enhance membrane module design with 3D printing technology, Journal of Membrane Science, vol. 499, pp. 480-490, XP029332159.

*Primary Examiner* — Brian A McCaig

(57) ABSTRACT

The disclosure describes a porous membrane including the following: at least one polymeric feature on a surface of a porous membrane wherein the at least one polymeric features are bonded to the membrane using a nanoscale injecting molding device. Another aspect of the disclosure includes a porous membrane including the following: a first film layer; a second film layer; at least one polymeric feature between the first film layer and second film layer, wherein the at least one polymeric feature is bonded to at least the first film layer.

8 Claims, 8 Drawing Sheets

(51) Int. Cl.
  *B01D 69/02* (2006.01)
  *B29C 64/112* (2017.01)
  *B33Y 10/00* (2015.01)
  *B33Y 70/00* (2020.01)
  *B33Y 80/00* (2015.01)
  *B01D 69/12* (2006.01)

(52) U.S. Cl.
  CPC ............ *B29C 64/112* (2017.08); *B33Y 10/00* (2014.12); *B33Y 70/00* (2014.12); *B33Y 80/00* (2014.12); *B01D 67/0004* (2013.01); *B01D 67/00045* (2022.08); *B01D 67/0079* (2013.01); *B01D 67/00791* (2022.08); *B01D 67/00793* (2022.08); *B01D 67/0093* (2013.01); *B01D 67/00933* (2022.08); *B01D 69/12* (2013.01); *B01D 69/1213* (2022.08); *B01D 2201/127* (2013.01); *B01D 2239/083* (2013.01); *B01D 2313/143* (2013.01); *B01D 2313/146* (2013.01); *B01D 2313/40* (2013.01); *B01D 2325/08* (2013.01); *B01D 2325/12* (2013.01)

(58) Field of Classification Search
  CPC .......... B01D 2325/12; B01D 2313/143; B01D 2313/146; B01D 2325/08; B01D 67/0004; B01D 67/00045; B01D 67/0079; B01D 67/00791; B01D 67/00793; B01D 67/0093; B01D 67/00933; B01D 69/12; B01D 69/1213; B01D 2239/083; B33Y 70/00; B33Y 80/00; B33Y 10/00; B29C 64/112; B29C 64/00
  See application file for complete search history.

(56) References Cited

U.S. PATENT DOCUMENTS

| | | | |
|---|---|---|---|
| 5,004,543 A | 4/1991 | Pluskal et al. | |
| 5,094,749 A | 3/1992 | Seita et al. | |
| 6,986,844 B2 | 1/2006 | Barss et al. | |
| 7,311,831 B2 | 12/2007 | Bradford et al. | |
| 7,465,335 B2 | 12/2008 | Schmidt | |
| 7,465,336 B2 | 12/2008 | McHugh et al. | |
| 7,582,137 B2 | 9/2009 | Chen et al. | |
| 8,883,007 B2 | 11/2014 | Buser et al. | |
| 9,616,390 B2 | 4/2017 | Hirozawa et al. | |
| 10,858,490 B2 | 12/2020 | Takeoka et al. | |
| 11,179,679 B2 | 11/2021 | Oborny et al. | |
| 2002/0166450 A1* | 11/2002 | Kishkovich ........ | B01J 20/28083 96/134 |
| 2004/0011723 A1* | 1/2004 | Bradford ............... | B29C 64/135 210/321.74 |
| 2004/0060858 A1* | 4/2004 | Lucas .................. | B01D 63/067 210/338 |
| 2004/0060867 A1 | 4/2004 | Kriksunov et al. | |
| 2005/0133441 A1* | 6/2005 | Charkoudian ..... | B01D 67/0093 210/500.42 |
| 2005/0227087 A1 | 10/2005 | Burgmeier et al. | |
| 2012/0261333 A1 | 10/2012 | Moran et al. | |
| 2012/0328844 A1 | 12/2012 | Zounek et al. | |
| 2013/0213880 A1 | 8/2013 | Hirozawa et al. | |
| 2014/0231332 A1 | 8/2014 | Hirozawa et al. | |
| 2015/0041388 A1 | 2/2015 | Hirozawa et al. | |
| 2015/0298064 A1 | 10/2015 | Takagi et al. | |
| 2015/0321148 A1 | 11/2015 | Hirozawa et al. | |
| 2016/0008763 A1 | 1/2016 | Roderick et al. | |
| 2023/0113186 A1 | 4/2023 | Roderick et al. | |

FOREIGN PATENT DOCUMENTS

| | | |
|---|---|---|
| CN | 101874988 A | 11/2010 |
| CN | 102335556 A | 2/2012 |
| CN | 102716676 A | 10/2012 |
| EP | 0350252 A1 | 1/1990 |
| EP | 12932441 A | 3/2003 |
| EP | 2 786 798 A1 | 10/2014 |
| EP | 02786798 A | 10/2014 |
| EP | 2902094 A1 | 6/2024 |
| GB | 840 757 A | 7/1960 |
| JP | S5343154 A | 4/1978 |
| JP | 58104604 A | 6/1983 |
| JP | S58163405 A | 9/1983 |
| JP | H08332306 A | 12/1996 |
| JP | H1076106 A | 3/1998 |
| JP | H11114381 A | 4/1999 |
| JP | 2000107539 A | 4/2000 |
| JP | 2004531583 A | 10/2004 |
| JP | 2006247453 A | 9/2006 |
| JP | 2010099590 A | 5/2010 |
| JP | 2010125418 A | 6/2010 |
| JP | 2011092905 A | 5/2011 |
| JP | 2012045540 A | 3/2012 |
| WO | 02/20142 A1 | 3/2002 |
| WO | 20040092211 A1 | 1/2004 |
| WO | 2005/094963 A1 | 10/2005 |
| WO | 2006012920 A1 | 2/2006 |
| WO | 2010056034 A2 | 5/2010 |
| WO | 2013125505 A1 | 8/2013 |
| WO | 2014016379 A1 | 1/2014 |
| WO | 2013125506 A1 | 7/2015 |
| WO | 2015/128256 A1 | 9/2015 |
| WO | 2017087461 A1 | 5/2017 |

\* cited by examiner

FEATURES ON A POROUS MEMBRANE

CROSS-REFERENCE TO RELATED APPLICATIONS

This application is filed under the provisions of 35 U.S.C. § 371 claiming priority of International Patent Application No. PCT/US2016/062184 filed on Nov. 16, 2016, which further claims the benefit under 35 USC 119 of U.S. Provisional Applications No. 62/257,355, filed Nov. 19, 2015, entitled, "3D PRINTED FEATURES ON MEMBRANES," and No. 62/257,359, filed Nov. 19, 2015 entitled "MEMBRANE LAMINATION USING 3D PRINTING," both of which are fully incorporated herein by reference.

FIELD OF THE INVENTION

The invention relates to porous membranes for liquid filtration, more specifically, polymeric features on the surface of the porous membranes or films of porous membranes for increased functionality.

BACKGROUND OF THE INVENTION

Porous membranes are used to filter materials such as liquids and gases in several applications. These porous membranes can be flat sheet or hollow fibers, and can be made of polymers, plastics, ceramics, metals, or composite materials. The membranes can be bonded to a housing to separate the feed-stream materials from the filtered materials or filtrate. In several configurations of a filter, a flat sheet membrane is bonded to the housing in specific ways depending on the needs of the filtration. One common method to increase filter membrane surface area in a housing is to pleat the membrane and then bond it in a housing. In such a configuration, the different pleats of the membrane needs to remain separated to optimize flow of the liquid through the filter.

A common practice in filter manufacturing is to include an open screen or spacer material between the pleats or layers of the porous membranes or films. For instance, in a pleated porous membrane in a filter housing, a screen or spacer is located along the membrane so the adjacent pleats in the membrane remain separated by the screen or spacer material. Another example, is in layers of a porous membrane screen or spacer is located between these layers to maintain separation between the layers so each layer is executing filtration on the liquid flowing through.

These screens and spacers are open, facilitate low pressure drop during filtration and are typically fabricated as woven and non-woven meshes, fiber nets, perforated sheets, corrugated and embossed sheets, ribbed sheets, porous metals, porous ceramics and other similar screens. There are several drawbacks to the screens and spacers. For example, the screens and spacers typically block a substantial part of the selective membrane. Spacers and screens are traditionally made from extruded sheets or fiber nets having a thickness of 50 microns or greater, this added thickness reduces the amount of membrane that can be packed into a housing. Further, in some cases, it is difficult to sufficiently seal the screen to the membrane and therefore this reduces performance. Furthermore, the cleanliness of the filter is compromised by the spacers and screen material which results in high levels of extractable impurities from the filter.

Traditional methods for manufacturing multilayer porous membranes require multiple layers of polymer material to be laminated together by heating. A disadvantage to this process is that the lamination can be compromised or can create defects or distortions to the features of the membrane. For that reason, lamination is limited to a single heating event to prevent continual distortion of the preformed porous membranes. For example, an open porous membrane laminated by traditional techniques can suffer from delamination over time because the large pores create minimal contact points between layers.

In the semiconductor industry and other industries going forward, there is a need for ultra clean materials that do not block a substantial part of the porous membrane to optimize flow of the liquid through the membrane. Further, there is a need to subject the porous membrane to the lamination process with minimal distortion to the membrane.

SUMMARY OF THE INVENTION

One aspect of the disclosure includes a porous membrane including the following: at least one polymeric feature on a surface of a porous membrane wherein the at least one polymeric features are bonded to the membrane using a nanoscale injecting molding device, wherein the polymeric features can be bonded to the membrane.

Another aspect of the disclosure includes a porous membrane including the following: a first film layer; a second film layer; at least one polymeric feature between the first film layer and second film layer, wherein the at least one polymeric feature is bonded to at least the first film layer.

Another aspect o of making at least one polymeric feature on a porous membrane which includes dispensing material from a nanoscale injecting molding device on to the surface of the porous membrane. The method further includes bonding the material of the polymeric feature to a material used for the porous membrane via a molecular inter-reaction.

Another aspect of the disclosure includes a membrane pack including the following: a pleated porous membrane, wherein the pleats comprising alternating peaks and valleys and opposing membrane walls interconnecting the alternating peaks and valleys of the pleats, and wherein the porous membrane has a first surface and a second surface and comprises one or more polymeric features bonded to a portion of at least the first surface of at least one of the opposing membrane walls, the polymeric features separate the opposing walls of the pleat.

BRIEF DESCRIPTION OF THE DRAWINGS

FIG. 4 show the polymeric features bonded as bridges on the porous membrane according to;

DETAILED DESCRIPTION OF THE PREFERRED EMBODIMENTS

Versions of the disclosure relate to membranes that have one or more polymeric features (herein referred to as "polymeric feature" or a "feature") that integrate with the surface to maintain functionality to a porous membrane. The features can be designed to modify the surface of a membrane to form flow features, affinity sites for absorption, sieving channels, conductive centers, biologically active sites, biocompatible centers, and more. In various versions, thermoplastic or thermoset polymeric features can be formed by 3-D printing can be bonded and fully integrated onto a film of a porous membrane or porous membrane or any sampling of a porous membrane, including a film of a porous membrane. The polymeric features can be in a specific pattern, shape and/or configuration to optimize the functionality of the membrane. The polymeric features are configured to be integrated into the membrane via bonding to enhance flow paths, cleanliness of the membrane, and/or functionality of the membrane. It should be understood that any configuration (e.g., random or geometric pattern) shape, size and number of discreetly printed polymeric features are described herein.

According to one version of the disclosure, the polymeric features are bonded to the film of a porous membrane or a porous membrane using 3-Dimensional (3D) printing. The polymeric feature can be printed in any configuration that can be normally made by a nanoscale injection molding apparatus known in the art. A 3D printer is an example of a nanoscale injection molding apparatus. 3D printing can be used to precisely control the shape, configuration, placement of polymeric features on the membrane or between films of a membrane, which can be used to create a defined flow path. The features can be made by any material that can be dispensed or ejected atop a surface of the film and that bonds or interlocks to the film. The shape of the features can vary depending on the material used to make the feature as well as the conditions used to operate the 3-D printer. In some versions the features comprising polymers can be symmetrical or asymmetrical, as illustrated by the idealized features in the figures.

Further, the 3D printing mechanics allows polymeric material to be printed with precision and at the resolution of the 3D printer being used. The current resolution of a polymeric feature that a current 3D printer can create is about 20 microns (width/diameter) by 20 microns (height). However, the disclosure is not limited to such resolution. The polymeric features can be varied based on the 3D printer resolution known in the relevant art. As 3D printers evolve, the print resolution can be improved to achieve even smaller features.

Figure 1:
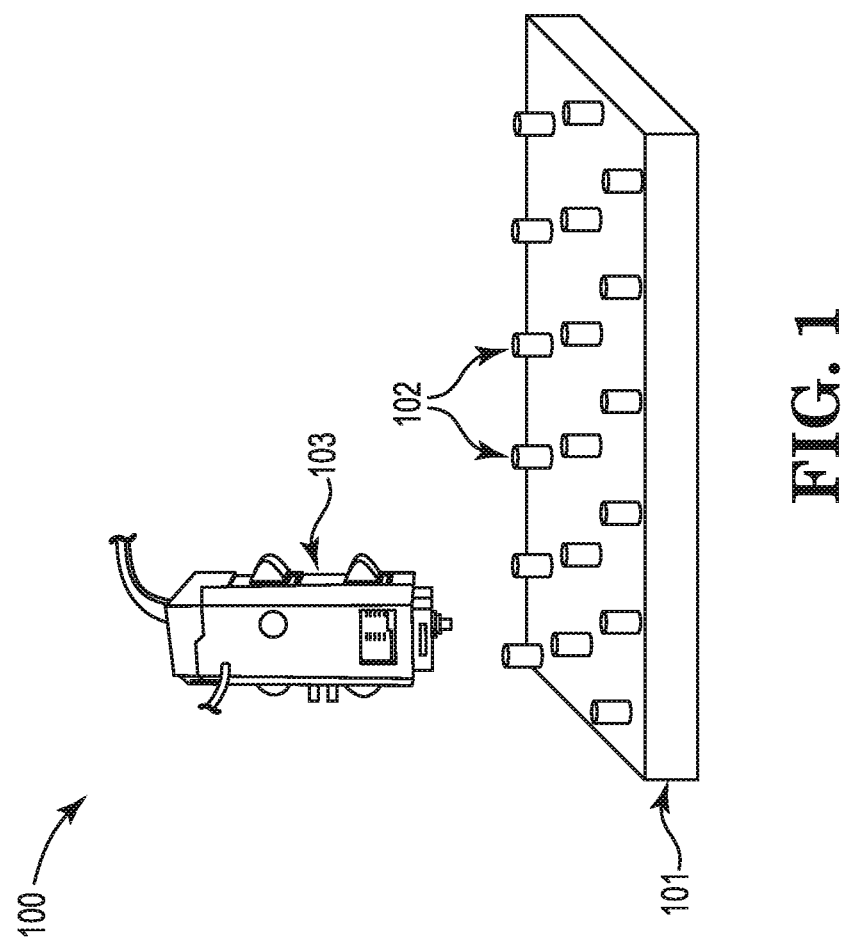
FIG. 1 shows a 3D printer dispensing a material to bond a polymeric features onto a membrane according to a version of the disclosure.

One version of the disclosure can be illustrated in FIG. 1. FIG. 1 exhibits a porous membrane 101 that has integrated polymeric features 102 on its surfaces. According to versions of the disclosure, the porous membrane can be any sampling of a porous membrane, which includes a film of a porous membrane. The polymeric features can be configured as a symmetrical cylinder having a diameter that is substantially the same from top to bottom. Referring to FIG. 1 the porous membrane 101 can be, a porous polymer such as, but not limited to, polytetrafluoroethylene (PTFE), ultra-high molecular weight polyethylene (UHMWPE), nylon, polyamide, polysulfone polyphenyl sulfone, polyvinylidene fluoride (PVDF), and/or perfluoroalkoxy (PFA) or polyurethane.

FIG. 1 shows a plurality of polymeric features 102 bonded or integrated with the porous membrane 101. The polymeric features 102 can be made from any thermoplastic or thermoset resin known in the relevant art. The polymeric feature can be cleaned using methods known in the relevant art. In another version of the disclosure, the polymeric feature can be cleaned without being chemically modified using methods known in the relevant art. A thermoplastic polymer is a polymer that can be shaped or molded by heating to a specific temperature and then hardened when cooled. A thermosetting resin is a material that irreversibly cures into an insoluble polymer cross-linked network, where curing is induced by heat. For example, but not by limitation, a polymeric feature can be made from the following or a combination of the following: perfluoromethylalkoxy (MFA), perfluoroalkoxyalkane (PFA), polytetrafluoroethylene (PTFE), polyvinylidene fluoride (PVDF), polypropylene, polysulfone, nylon, polyethylene, polycarbonate, Liquid Crystal Polymers, either individually or in combinations of two or more thereof.

The shapes of the polymeric features can vary depending on the flow of the liquid required by the filter. For examples the shapes can be, but not limited to geometric and non-geometric shapes such as, cylinders, bridges, cones, and/or diamonds. The sizes can vary depending on the abilities of the nanoscale injection molding apparatus and/or the preferred flow requirements of the filter. The distance between each of the features can vary as well depending the applications requirements of the porous membrane. Different ranges between the features of distance contribute to different flow paths. For example, the higher the concentration of features per unit area the higher the pressure drop. Referring to FIG. 1 the spacing between the cylinder polymeric features 102 can be about 100 microns, but any spacing dimension or configuration can be used.

Referring to FIG. 1, 103 is a nanoscale injecting molding device used to eject or dispense material such as a polymer to form features on a surface a porous membrane. In a version of the disclosure, the nanoscale injecting molding apparatus is a 3D printer and the material dispensed are polymer drops. It should be understood that any configuration (e.g., random or geometric placement) shape, size and number of discreetly printed polymeric features known in the relevant art are included in this disclosure. A 3D printer allows a polymeric material to be deposited or dispensed with precision and at the resolution of the 3D printer. According to an embodiment of the disclosure a 3D printer can create a features of 2 microns (diameter/width) by about 20 microns (height).

Embodiments of the disclosure are not limited to the described resolution and as 3D printers evolve, the print resolution will be improved to achieve even smaller resolutions and create smaller features. In a version of the disclosure, the 3D printer can be fed a filament feed stock that is used for the material of the polymeric feature. According to another version of the disclosure, other thermoplastics could be used as a reactive components. For example, resin could react at or within the nozzle of the 3D printer and form in-situ thermoset while interacting with the porous membranes surface. In another example, the polymer and pore former could be made in advance of 3D printing.

According to the disclosure, the membrane with polymeric features 102 as shown in FIG. 1 can assist in directing flow path of a liquid through the filter by having the liquid between the polymeric features. These polymeric features will have directed flow due to the placement and size of the polymeric features. This is because the polymeric features provide a separation in a pleated membrane or calendared structure in a porous membrane. According to a version of the disclosure, calendared is when the temperature is above the glass transition temperature, Tg, of the polymer and through compression the polymers are integrated together. Thus, a person in the ordinary skill in the art can customize the design and size of the polymeric features based on the application to customize the flow path of the liquid that contacts and moves through the membrane.

According to a version of the disclosure, the 3D printer ejects a polymer onto the porous membrane to bond at least one polymeric feature to a surface of the porous membrane. As known in the relevant art, if the polymeric feature comprises a thermoplastic resin then proper choice of pressure and temperature will drive the adhesion of the feature to the surface. The polymeric features are bonded and integrated into the porous membrane, wherein the porous membrane can be any sampling of a porous membrane.

According to a version of the disclosure, the bonding can be accomplished by a molecular inter-reaction between a polymeric feature and a porous membrane. Depending on the material used for the porous membrane and the polymeric features the bonded porous can be a homogeneous blend or a composite as known in the relevant art. The type of bonding desired is based on the material or polymer blend used of the polymeric feature and the material or polymer blend of a porous membrane. Based on the surface tensions of the materials and/or the contact angle between the polymeric features and the porous membrane the bonding can be determined. In one version of the disclosure, the surface energy of the two mating material or polymer blends can be within 20 percent of the surface tension of each other.

According to a version of the disclosure, the compatibility between the polymer or material used for the polymeric feature and the material or polymer of the porous membrane is determined. The molecular inter-reaction between the polymeric feature and the porous membrane can be compositions of chemically similar or different materials or blends. As known to one with the ordinary skill in the art, these blends are homogeneous if the components are compatible and mix at molecular level. Blends are heterogeneous or incompatible if the components are present in separate phases. Whether two or more materials or polymer blends are compatible or not, also depends on temperature. If the materials or polymer blends are incompatible, mechanical energy is needed to disperse the minor phase (mixing) and coalescence occurs if the blend morphology is not stabilized. For example, interfacial forces such as the interfacial tension become important and can change the rheological signature of the blend significantly. According to a version of the disclosure, based on the bonding desired at least one or more of the following would be considered: the polymer blend, temperature, contact angle, and surface tensions.

According to the disclosure, once the material or polymer blend used for the polymeric feature and the material or polymer blend used for the porous membrane is determined, the polymeric feature and the porous membrane are knitted together via a molecular inter-reaction. To facilitate the knitting between the materials or polymer blends, the temperature of the porous membrane and polymeric features is set to the melting temperature of the lowest constituent of the inter-reaction. This can allow the polymeric feature and the porous membrane to bond via a molecular inter-reaction. The melting temperature is set to melt the lowest constituent is well known in the art. A person in the ordinary skill in the art can set the temperature so that the pores of the porous membrane are not closed and/or distorted.

Further, according to a version of the disclosure, the extent of bonding between the polymeric feature and the surface of the porous membrane, more particularly the extent of polymer chain entanglement and molecular inter-reaction between the polymeric features and the porous membrane can be measured. For example, and not by limitation, dynamic rheology and the shear at the surface of the porous membrane can be measured. If the polymeric feature is bonded or inter-penetrated with the surface of the porous membrane a storage modules higher than that of the base material will be measured.

Figure 2B:
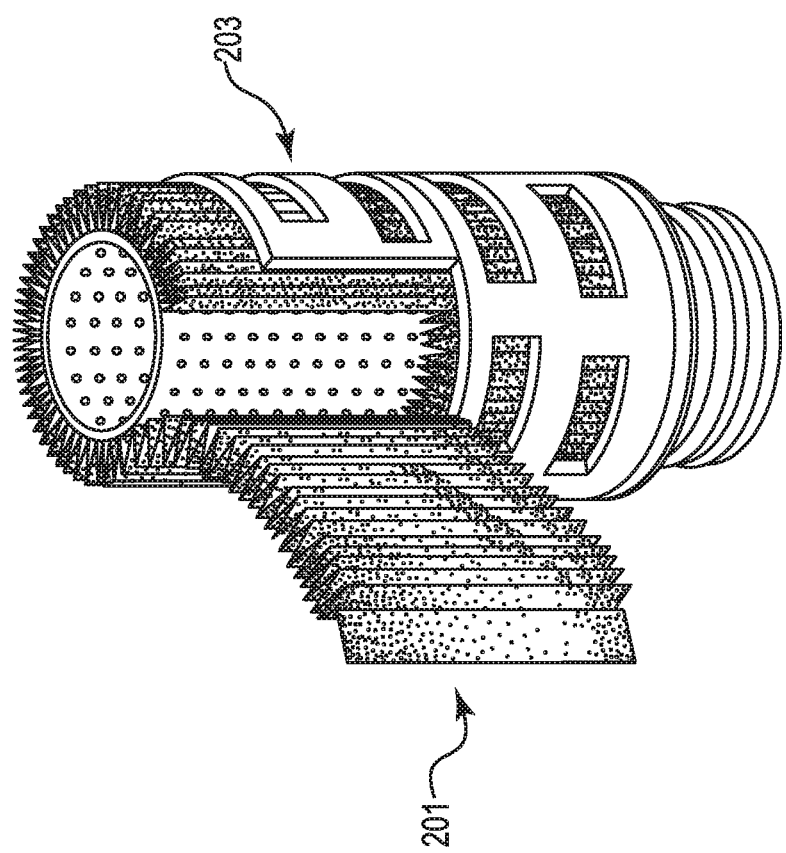
FIG. 2a shows a pleated porous membrane with bonded polymeric features and FIG. 2b shows a filter cartridge with a pleated porous membrane in which a gradient of non-uniform distribution of polymeric features on a surface of the membrane is illustrated according to one version of the disclosure.
Figure 2A:
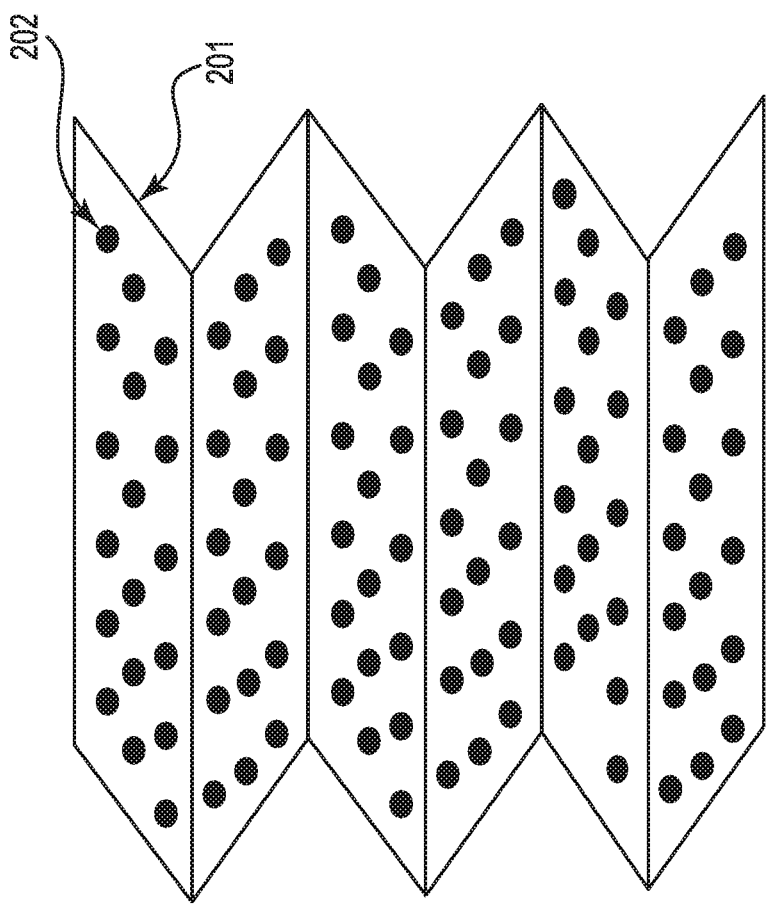

FIG. 2 is shows a pleated porous membrane according to a version of the disclosure. FIG. 2a shows a pleated porous membrane 201 that has one or more polymeric features bonded to a surface of the membrane 202. FIG. 2b shows the pleated porous membrane 201 that is bonded with the polymeric features 202, the membrane inserted and pleated in the filter cartridge 203. An example of a pleated porous membrane is, but not limited to, a pleated PTFE or ultra-high molecular weight polyethylene membrane. According to the disclosure, the polymeric features on a membrane surface compared to a membrane without polymeric features allow the pleats to be spaced so they flow of the liquid through the filter is maintained or improved. In one version of the disclosure, the space between the filters can be about 20 to 1000 microns apart. Based on the design and consistency of the polymeric features the flow of the solution can be controlled. Referring to FIG. 2, the polymeric features only use a small portion of the space over the membrane surface. In a version of the disclosure, the percentage of space the polymeric features cover of the surface of the porous membrane can be less than 1 percent or as high as 50 percent. Depending on the usage, the coverage of the polymeric features can also be higher than 50 percent. In one embodiment of the disclosure the features are set to a 20 microns of distance apart. The distance and amount of features can be varied based on the intended flow of the solution. It should be understood that a person skilled in the art can customize the features to achieve the desired flow properties of the porous membrane. As shown in FIG. 2b the pleated membrane 201 has the polymeric feature in a different design than shown in FIG. 2a. In a version of the disclosure, the polymeric features can exist on one side or both sides of the pleated membrane. In another version of the disclosure, the polymeric features can be bonded on the folds of the pleated membrane.

Figure 3:
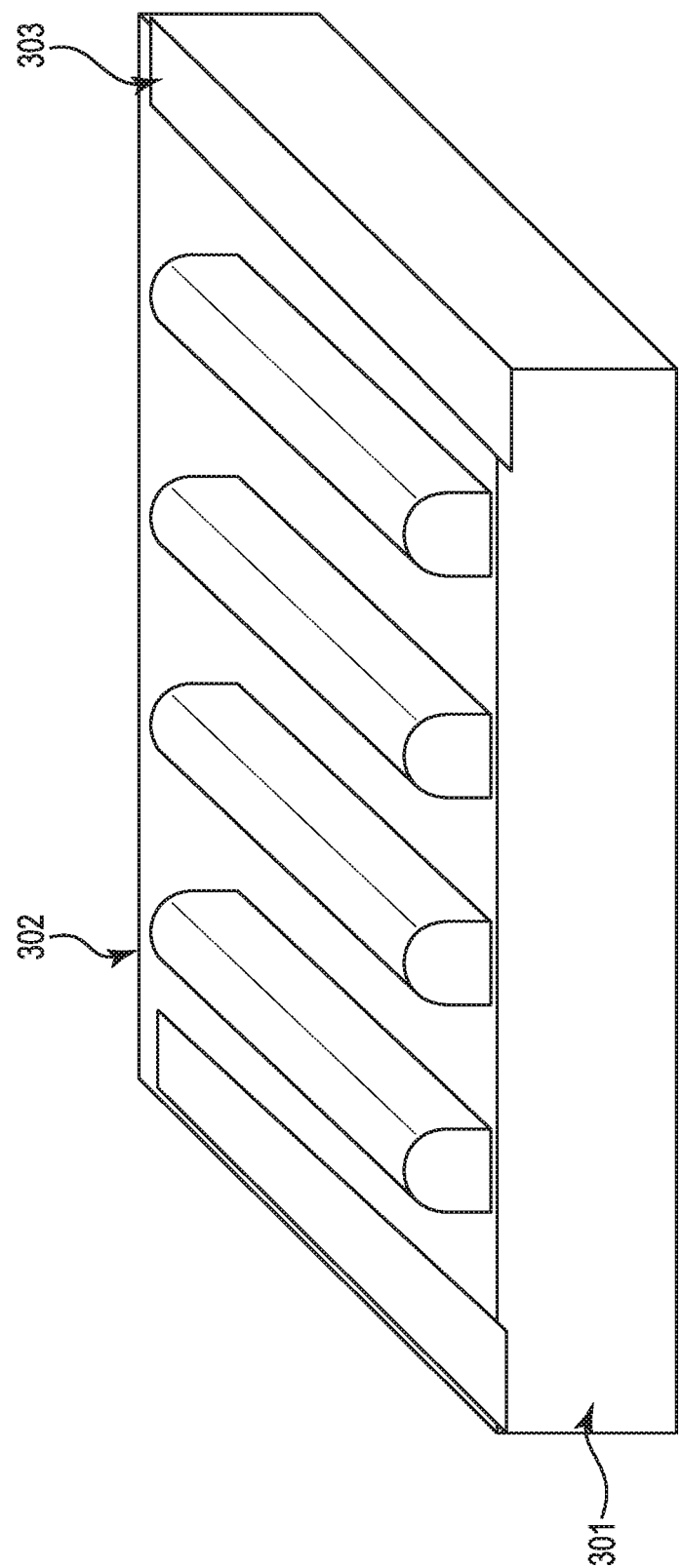
FIG. 3 shows the polymeric features designed as lanes on the porous membrane according to another version of the disclosure.

FIG. 3 shows the polymeric features bonded onto the porous membrane 301 as a lane, wherein the porous membrane can be any sampling of the porous membrane such as a film of a porous membrane. Referring to FIG. 3, the polymeric features 302 can be bonded as a lane having a height and width that is selected for the intended feature. In one version of the disclosure, the height of the lanes can be, but not limited to 20 to 1000 microns and width of the lanes can be 20 microns or less, for example about 2 microns, and the distance between each lane can be 100 microns or less, for example 10 microns. In a version of the disclosure, printed lanes 302 can be integrated into the porous membrane to promote lateral flow. In a version of the disclosure, the edges of the porous membrane can be partially or completely laminated or potted in a housing. To accomplish this, a ribbon or strip 303 of polymer can be formed separately or 3D printed on the edge(s) to a suitable width, for example 20 microns, to provide a seal when thermally laminated to another film. See FIG. 3 for an illustration of the printed strip. In a version of the disclosure, the ribbon or strip can be about 1 mm to about 15 mm wide. The ribbon strip can be, but not limited to, MFA (perflouro methyl alkoxy), which is a copolymer of teraflourethylene and perflouromethyl vinyl ether.

Figure 4:
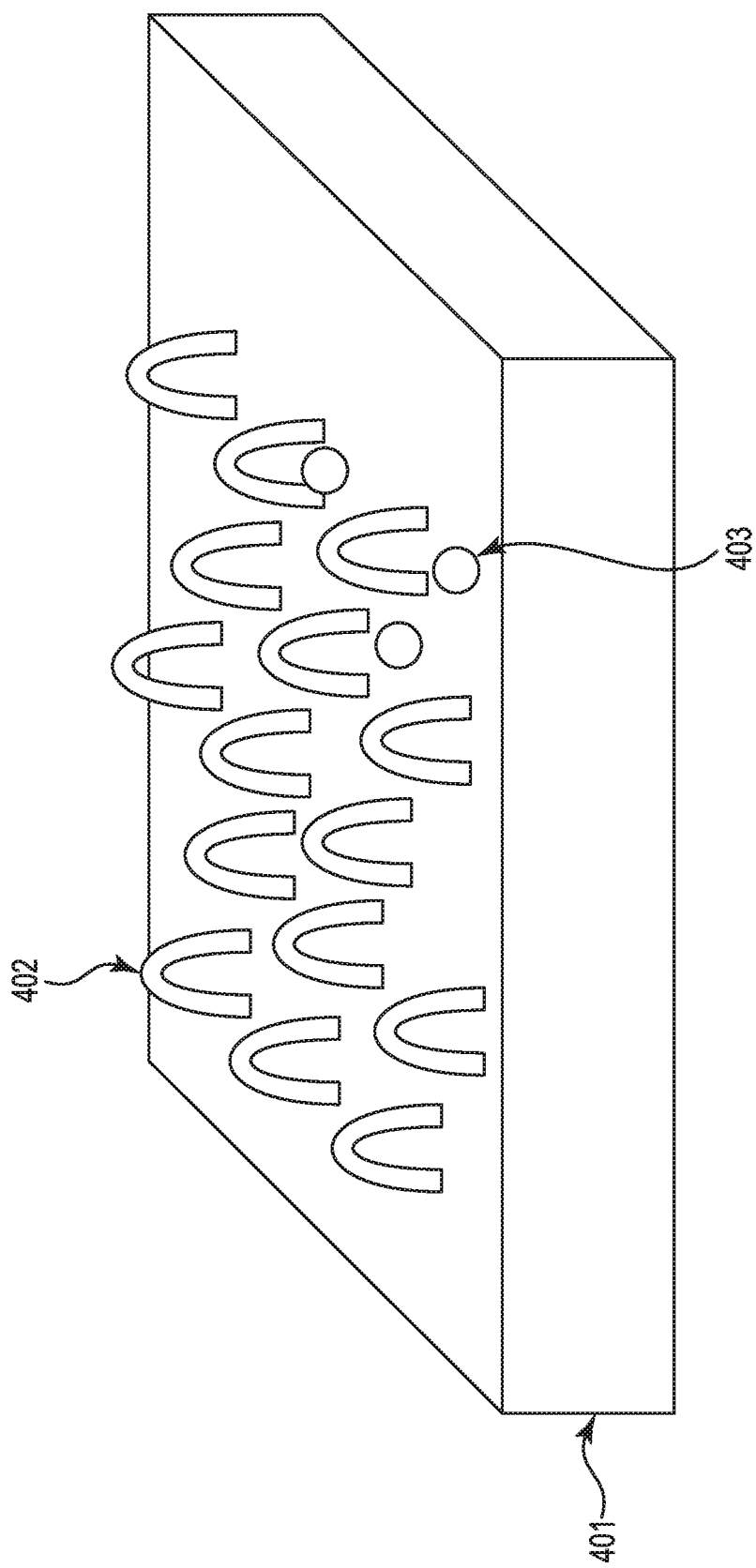

FIG. 4 shows polymeric features bonded to a porous membrane, or sampling thereof 401 as bridge structures 402 according to the present disclosure. As shown in FIG. 4, the bridge structure 402 can have two posts adjoined at an end (having the appearance of an inverted U) to provide a bonding point of contact between porous film layers of the porous membrane with sufficient structural integrity, but that does not disrupt the flow features of the porous membrane. In a version of the disclosure, the two posts of one polymeric features can be 20 micron apart though other spacings are feasible in a range of 100 microns to 10 microns. The contamination particles 403 are shown between the posts of the bridge. When the film layers are calendared, the fluid space around the bridge structures will be preserved and can have sieving properties. An example of a porous membrane with bridge structures can be PTFE membrane with PFA bridge polymeric features.

Figure 5:
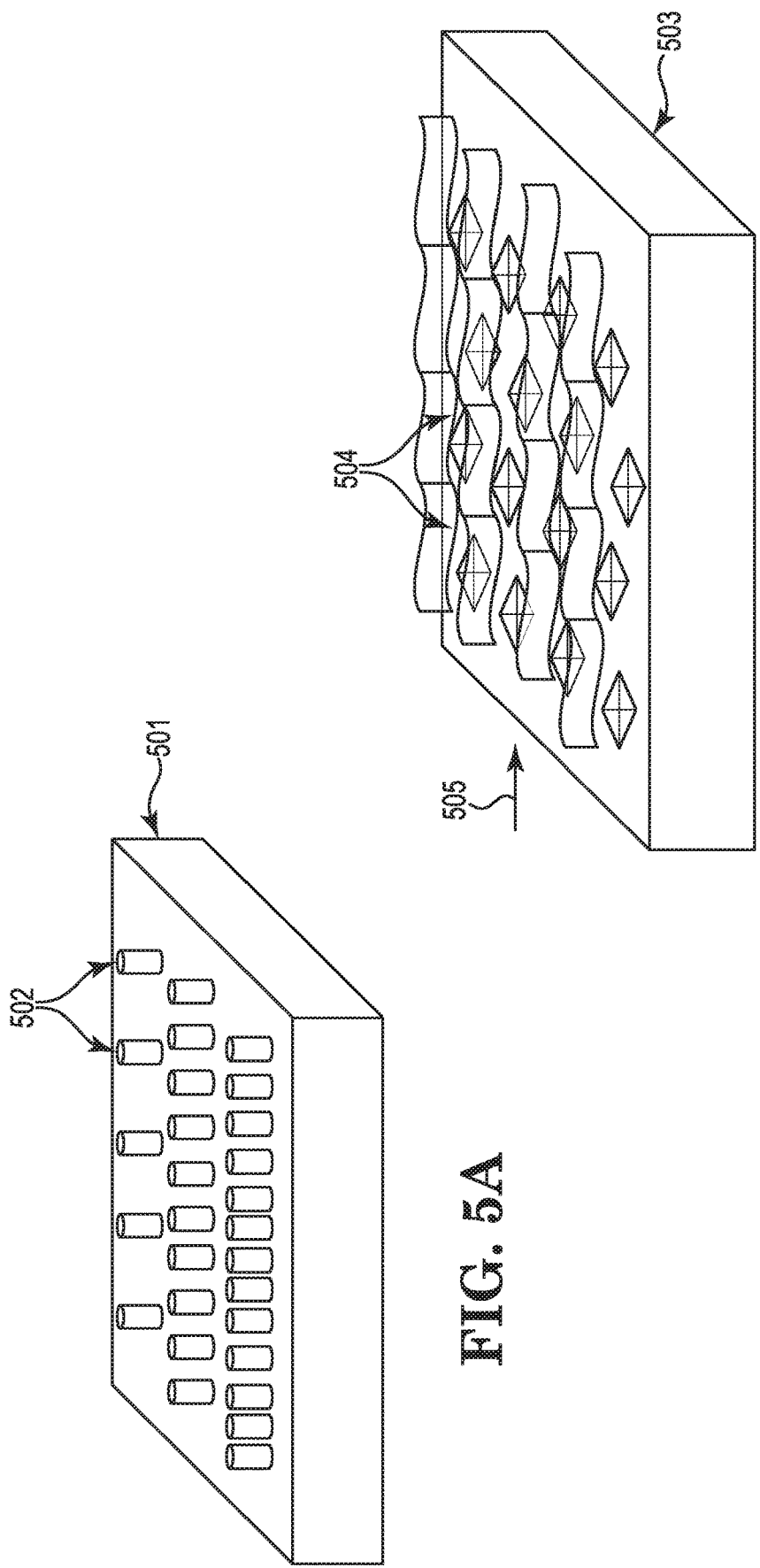
FIG. 5a shows polymeric features that have a geometric shape which is pyramid-like manner on a porous membrane and FIG. 5b shows the polymeric features configured in a staggered manner on the film of a porous membrane or porous membrane according to a version of the disclosure.

FIGS. 5a and 5b show porous membranes, or sampling thereof 501 and 503 that have polymeric features 502 and 504 bonded in a formation to allow a desired flow patterns. FIG. 5a shows the polymeric features 502 bonded to a porous membrane 501 in a pyramid-like structure that allow for support between the porous membranes. FIG. 5b shows the polymeric features 504 in a staggered formation, this allows the flow pattern 505 to increase the accumulation of contamination on the surface of the porous membrane, which can increase the functionality of the filter by building up the contamination and letting it be washed down. The staggered formation allows for a turbulent flow pattern as shown in 505.

Figure 6:
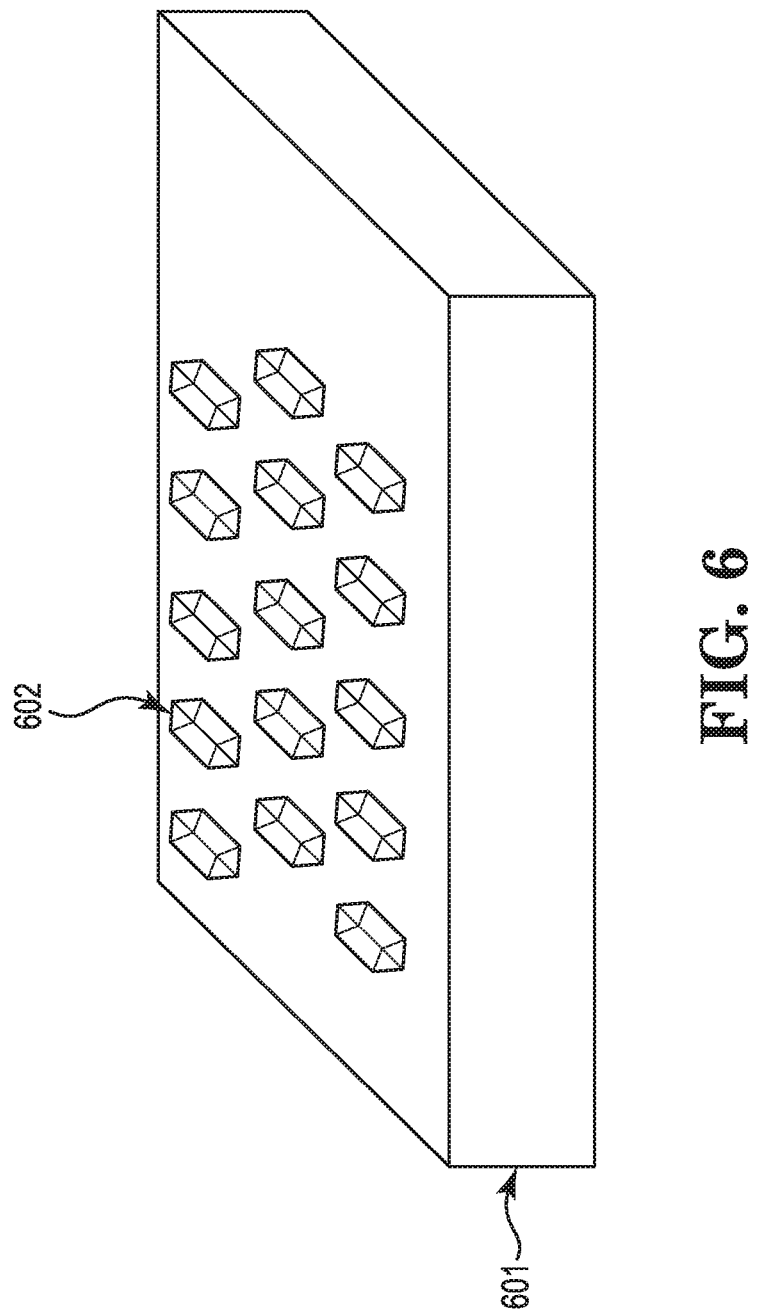
FIG. 6 shows extruded polymeric features that have a hexagon shape according to a version of the disclosure.

FIG. 6 shows a porous membrane 601, which can be any sampling of a porous membrane including a film of a porous membrane, that has polymeric features 602 bonded to the porous membrane. The polymeric features are shaped as extruded hexagon to allow a flow pattern. This configuration can have the dimensions to 20 to 1000 microns in width of the hexagon. In a version of the disclosure, the extruded hexagon polymeric features can be bonded to a porous membrane to manipulate the pressure drop within the filter. According to the disclosure, the spacing of the polymeric features can increase or decrease the pressure drop in the membrane. For example, but not by limitation, as the polymeric features are designed with less space between the polymeric features the pressure drop increases. In another example, designing the polymeric features as to narrowing the features in the middle of the porous membrane compared to the outer surface of the porous membrane will offset this increase in pressure drop.

Figure 7:
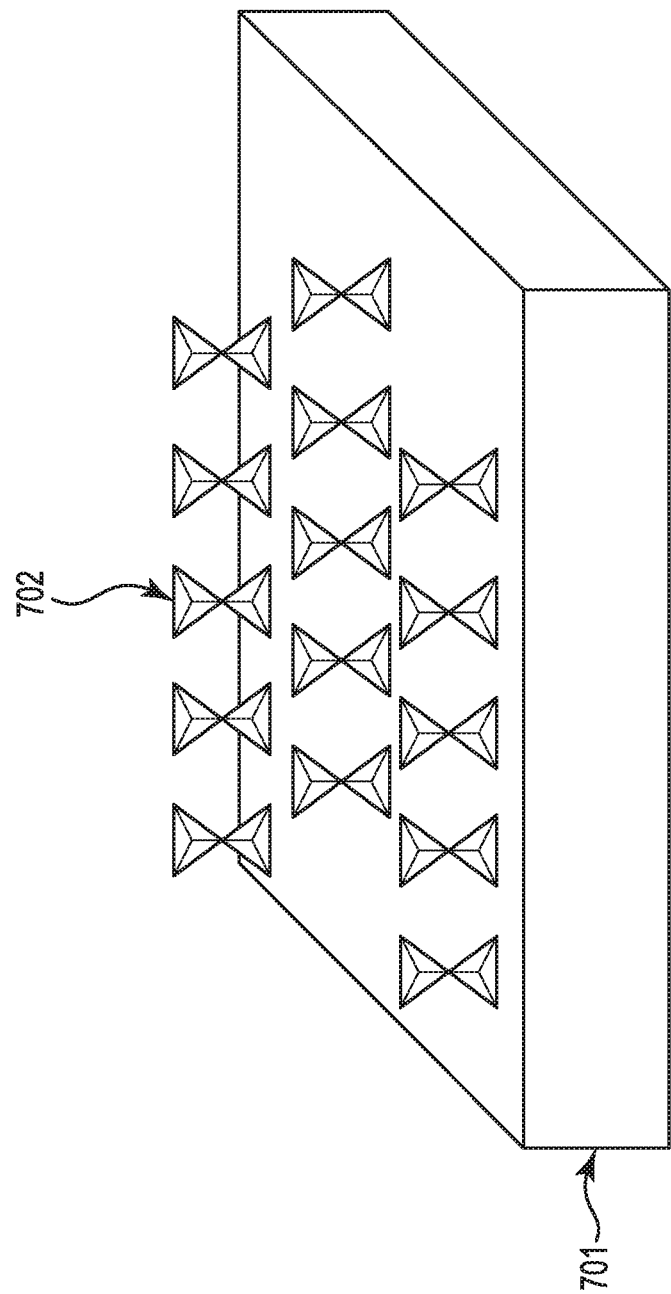
FIG. 7 shows the polymeric features bonded as hourglass shape to a membrane surface according a version of the disclosure.

FIG. 7 shows a porous membrane 701, or any sampling of a porous membrane, that has polymeric features 702 bonded to the porous membrane. The polymeric features are hourglass-like to allow a desired flow pattern. This configuration can have the dimensions 20 microns to 1000 microns at the base or the top of the hourglass. As discussed above, the design and spacing of the polymeric features can manipulate the pressure drop of the membrane as the fluid is going through the membrane. For example, but not by limitation, as the polymeric features are designed closer together so the pressure drop increases. In another example, designing the polymeric features as to narrowing the features in the middle of the porous membrane will offset this increase. Referring to FIG. 7 the polymeric features' 702 shape can be manipulated to adjust the shape on the Z-axis, not just the Y-axis and X-axis.

According to a version of the disclosure, a polymeric feature can be ejected or dispensed onto the surface of a porous membrane, or sampling thereof while the 3D printer is positioned at an angle of about 90° to the porous film. This configuration is desirable for printing polymeric features for structural integrity between films or porous membranes and/or to define an area of flow. The angle between the axis of the nozzle of the 3D printer and the surface of the porous membrane of the printed feature can be varied based on the contact angle of the hydrophilic polymers and the shape desired. For example, about 1 degree in the case of a sphere and about 89 degrees in the case of a post.

Table 1 shows some examples of contact angles and surface tensions. As discussed herein, the surface tension and contact angles can be used to determine the polymer blend used for the polymeric features to obtain the desired bonding between the polymeric feature and the porous membrane.

TABLE 1

| Polymer | CAS # | Surface tension | Contact angle of hydrophilic polymers |
|---|---|---|---|
| Polyvinyl alcohol (PVOH) | 25213-24-5 | 37 | 51 |
| Polyvinyl acetate (PVA) | 9003-20-7 | 35.3 | 60.6 |
| Nylon 6 (polycaprolactum, aramid 6) | 25038-54-4 | 43.9 | 62.6 |
| Polyethylene oxide (PEO, PEG, polyethylene glycol) | 25322-68-3 | 43 | 63 |
| Nylon 6,6 | 32131-17-2 | 42.2 | 68.3 |
| Nylon 7,7 | — | 43 | 70 |
| Polysulfone (PSU) | 25135-51-7 | 42.1 | 70.5 |
| Polymethyl methacrylate (PMMA, acrylic, plexiglas) | 9011-14-7 | 37.5 | 70.9 |
| Nylon 12 | 24937-16-4 | 37.1 | 72.4 |
| Polyethylene terephthalate (PET) | 25038-59-9 | 39 | 72.5 |
| Epoxies | — | 44.5 | 76.3 |
| Polyoxymethylene (POM, polyacetal, polymethylene oxide) | 24969-26-4 | 37 | 76.8 |
| Polyvinylidene chloride (PVDC, Saran) | 9002-85-1 | 40.2 | 80 |
| Polyphenylene sulfide (PPS) | 26125-40-6 | 38 | 80.3 |
| Acrylonitrile butadiene styrene (ABS) | 9003-56-9 | 38.5 | 80.9 |
| Nylon 11 | 25587-80-8 | 35.6 | 82 |
| Polycarbonate (PC) | 24936-68-3 | 44 | 82 |
| Polyvinyl fluoride (PVF) | 24981-14-4 | 32.7 | 84.5 |
| Polyvinyl chloride (PVC) | 9002-86-2 | 37.9 | 85.6 |
| Nylon 8,8 | — | 34 | 86 |
| Nylon 9,9 | — | 34 | 86 |
| Polystyrene (PS) | 9003-53-6 | 34 | 87.4 |

TABLE 1-continued

| Polymer | CAS # | Surface tension | Contact angle of hydrophilic polymers |
|---|---|---|---|
| Polyvinylidene fluoride (PVDF) | 24937-79-9 | 31.6 | 89 |
| Poly n-butyl methacrylate (PnBMA) | 25608-33-7 | 29.8 | 91 |
| Polytrifluoroethylene | 24980-67-4 | 26.5 | 92 |
| Nylon 10,10 | — | 32 | 94 |
| Polybutadiene | 9003-17-2 | 29.3 | 96 |
| Polyethylene (PE) | 9002-88-4 | 31.6 | 96 |
| Polychlorotrifluoroethylene (PCTFE) | 9002-83-9 | 30.8 | 99.3 |
| Polypropylene (PP) | (a) | 30.5 | 102.1 |
| Polydimethylsiloxane (PDMS) | 9016-00-6 | 20.1 | 107.2 |
| Poly t-butyl methacrylate (PtBMA) | 25189-00-9 | 18.1 | 108.1 |
| Fluorinated ethylene propylene (FEP) | 25067-11-2 | 19.1 | 108.5 |
| Hexatriacontane | 630-06-8 | 20.6 | 108.5 |
| Paraffin | 8002-74-2 | 24.8 | 108.9 |
| Polytetrafluoroethylene (PTFE) | 9002-84-0 | 19.4 | 109.2 |
| Poly(hexafluoropropylene) | — | 16.9 | 112 |
| Polyisobutylene (PIB, butyl rubber) | 9003-27-4 | 27 | 112.1 |

In another version of the disclosure, the polymeric features can have pores within the feature. Accordingly, flow efficiency of a membrane can be optimized by allowing liquid or fluid to pass through the feature rather than to divert flow. This can be accomplished by creating pores in the polymeric feature. The porosity of the polymeric feature can be modified by incorporating clay, salts or solvents (pore formers) within the polymer produce an entrained polymer. Accordingly, after the material or polymer blend is bonded as a polymeric feature onto the porous membrane, the entrained clay, salt or solvent can be removed, such as by washing with suitable solvent or leaching of the pore former. The solvent used for washing the polymeric features can be any solvent known in the relevant art. In several examples, the solvent can be water or a solvent that is compatible with the pore-former or solvent. This creates pores or voids in the feature that allow flow through a tortuous path. According to a version of the disclosure, to maintain the structural integrity of the feature, the pore forming material should be less than the total percentage area of the feature, for example about 0.1% to less than about 50% cm². The percent area of the pores within the polymeric feature can be measured in microns or any area unit, so that the free space or pore volume in 2-Dimension is between about 0.1% to about 50% of the total area.

In another version of the disclosure, a nanoscale injecting molding device or 3D printer can also be used to print chromatographic media on the surface of a porous membrane and/or the polymeric features. In a version of the disclosure, chromatography media is typically made into spherical polystyrene beads which can be printed as a filament onto the membrane as known in the relevant art. In one example, the surface of a membrane having a plurality of features comprising Nafion (sulfonated tetrafluoroethylene based fluoropolymer-copolymer), or any charged species (cation or anion). In another example, two monomers can be 3D printed on to the surface of the porous membrane and allowed to polymerize, in situ.

In another version of the disclosure, the surface can be bonded with polymer features that can serve as biologically active ligand or biocompatible centers. This provides further functionality to the polymeric features on the porous membrane. Thus, the polymeric features are not only used to create space between films or layers of the porous membranes or enhance lamination but also to increase the proficiency of the filtration of the fluid. According to a version of the disclosure, the chromatography media can be printed on the porous membrane, the polymeric features, or a combination thereof.

In another version of the disclosure, the polymeric features can allow for improved lamination between two porous films in a membrane. Based on the configuration polymeric features on a film of a porous membrane, the polymeric features can provide contacts points for lamination between the two films or porous membranes. The contact points are the points on the polymeric features between the two films or porous membranes.

Figure 8A:
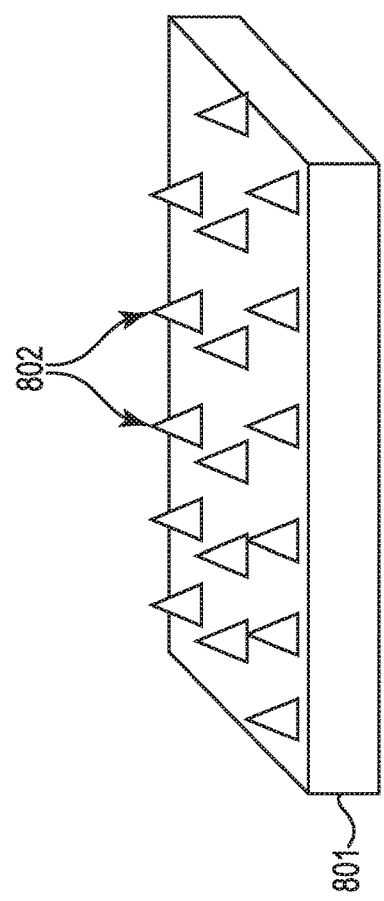
FIG. 8*a* shows the polymeric features designed as asymmetric cones on a porous membrane and FIG. 8*b* shows two films of a porous membrane or porous membranes laminated at the contact points of the polymeric features according to a version of the disclosure.
Figure 8B:
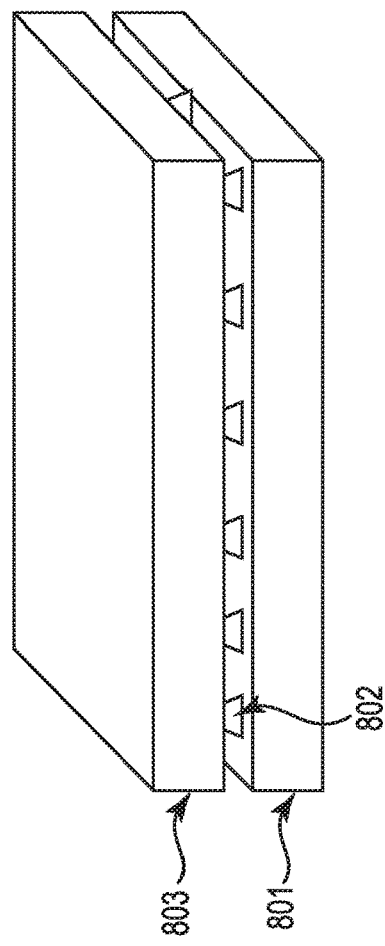

FIG. 8A shows a film of a porous membrane 801 that is has a plurality of polymeric features 802, where the polymeric features are shaped as asymmetric cones. Referring to FIG. 8b, the asymmetric polymeric features have a small end of a cone and the small end of the cone shape will be in contact with a film to be laminated 803. According to a version of the disclosure, the purpose of the cone shape is to minimize pooling of the polymer during calendaring. This will allow the film layers to be laminated while maximizing membrane area. According to a version of the disclosure, 801 can be a porous membrane and 803 can be a second porous membrane that are laminated together.

According to another version of the disclosure, the film of the porous membrane 801 with the bonded polymeric features 802 and the film 803 are not laminated, but placed on top of one another as a stack. According to this version of the disclosure, 801 can be a porous membrane and 803 can be a second porous membrane that are stacked on top of one without lamination. According to a version of the disclosure, 801 can be a porous membrane and 803 can be a second porous membrane that are laminated together.

According to the disclosure, the polymeric feature cones can be printed on a surface of a porous membrane in a pattern and amount that will ensure that films remain laminated. In one version of the disclosure, the polymer feature cones are bonded to the film surface by using a 3D printer known in the relevant art. The 3D printer can strategically print polymer feature cones in a specific pattern in discrete amounts to increase the inter-laminar bind strength between the layers of a porous membrane. The patterns to increase inter-laminar strengths are known in the relevant art. This is particularly useful for strengthening the bonds between asymmetric layers of an open porous membrane. In a version of a disclosure, a 10 nm pore size membrane can be laminated to a 0.1 micron membrane at the contact points of the polymeric features between the two membranes.

Versions of the disclosure comprising one or more membranes with polymeric features on the surface can include membraned with a symmetric pore structure, an asymmetric pore structure, or combinations of such membranes stacked serially or in alternating layers in a porous membrane. Porous membranes in a version of the disclosure are microporous. In other versions of the disclosure, the porous membranes can be, but not limited to, ultra-porous membranes, skinned membranes, and cross flow filtration membranes and can be wet, non-porous films can also be wet with features therein.

In one version of the disclosure, the polymeric feature cones are printed in a designed pattern over discrete sites on at least a portion of the surface of the film or at discrete sites on the entire surface of the film for lamination with another film. The polymer cones can be printed on one film or on both surfaces of both films to be laminated together.

According to the disclosure, for certain membranes, the edges of the membrane may also need to be partially or completely laminated. Rather than printing spaced polymeric feature cones on the edge of a film, a ribbon or strip of polymer can be 3D printed on the edge(s) to a suitable width to ensure an optimal seal when thermally laminated to another film. See FIG. 3, the ribbon or strip 303 can be about 1 mm to about 15 mm in width. The strip can be made from the same polymer as the polymeric features such as MFA.

In one example, the surface of the porous film can be printed with the polymeric feature cones while the edge(s) of the film can be printed with a ribbon or a strip of polymer. The strip can be made of similar materials to the cones or different depending on end use application. For a high pressure application the posts do not need as much strength as the sealing strip, therefore the material of the strip may be different from the material of the cones that are known in the relevant art.

According to the disclosure, flow efficiency of a membrane can be optimized by allowing flow to pass through the printed lamination feature rather than to divert flow. As discussed above, in one version of the disclosure, the polymeric features can have pores within the feature. The porosity of the feature can be modified by incorporating clay, salts or solvents (pore formers) within the polymer to produce an entrained polymer. The dimension can be, but not limited, to 20 micron to 1000 microns in perimeter of the shape.

According to a version of the disclosure, the lamination of the films with polymeric features together can be accomplished at a temperature that is at the melt temperature of the polymeric features but lower than the melt temperature of the film layers of the porous membrane. In a version of the disclosure, the lamination is done at the contact points of the polymeric is features. The contact points are on the part of the polymeric features that make contact with the film of the porous membrane or the porous membrane. According to a version of the disclosure, if the polymeric features include thermoplastic or thermoset resin, the thermoplastic of thermoset resin has a lower melt temperature than the melt temperature of the material. The lamination temperature can then be set to the melt temperature of the material or polymer blend used for the polymeric features. Since the melt temperature is below the temperature of the material or polymer blend of the porous membrane, the integrity of the pores, and porous membrane are not compromised in the lamination process. For example, but not by limitation, a PFA (perfluoroalkoxy resin) polymer blend can be used for the polymeric feature and PTFE as the polymer blend for the porous membrane. The PFA melts in a range of 280-316 degrees C. while the PTFE melts at 326 degrees C. As such the lamination procedure can be performed at a melt temperature of approximately 280-316 degrees C.

In a version of the disclosure, the porous membranes can be surface modified by grafting or exposure to a gas like oxygen and energy from a UV lamp. The treatments or modification can be performed before or after the features are forms. The treatment can alter the surface energy of the porous membrane.

In a version of the disclosure, the lamination process using 3D printed polymeric features allows for the manufacture of components that can be later assembled into the final membrane, referred to as staged laminations. For example, a component can be an assembly of fewer than the necessary number of layers of the final porous membrane. The components can be assembled into the final product at a later time in the manufacturing process. For example, but not by limitation, a membrane comprising A-B-C-D layers can be made by assembling A-B component to C-D component. According to the disclosure, the lamination films have a higher melt temperature than the printed polymeric features, lamination therefore can occur in stages since the base membrane is never affected by the temperature at which the features melt which minimizes or eliminates distortion to the pores or the porous membranes.

In a further version of the disclosure, the polymeric features facilitate lamination of dissimilar materials. For example, tie layers can be printed to bond dissimilar membranes together. According to the disclosure, a tie layer is a co-extrusion employing a tie layer between two layers of different polymer materials. The tie layer is formed in the extrusion melt of a composition including one of the two materials or polymer blends and a coupling agent that includes functional groups that are reactive at least with functional groups on the second polymer. The coupling agent may be incorporated into the tie layer material in amounts above 5% by weight.

Accordingly, the polymeric feature can be bonded to dissimilar membranes to form as a composite laminate. For example, it is possible to laminate nylon to ultra-high molecular weight polyethylene with high density polyethylene posts so as not to distort the UHMWPE or the nylon during lamination. Dissimilar membranes that can be laminated together, but not limited to, are Nylon/PTFE, Nylon/PE, polysulfone/PE, polysulfone/PTFE, PTFE/nylon, PVDF/PTFE, in combinations of two or more thereof.

One further embodiment of the disclosure includes a membrane pack which is a pleated porous membrane. The pleats include alternating peaks and valleys and opposing membrane walls interconnecting the alternating peaks and valleys of the pleats, the porous membrane has a first surface and a second surface and includes one or more polymeric features bonded to a portion of at least the first surface of at least one of the opposing membrane walls, said polymeric features separate the opposing walls of the pleat.

In a further embodiment of the disclosure includes the membrane pack described above includes polymeric features on both opposing membrane walls have the polymeric features.

In a further embodiment of the disclosure the membrane pack described above includes the peaks and valleys of the pleats include polymeric features.

In a further embodiment of the disclosure the membrane pack described above includes the first and second surface of the membrane comprise one or more polymeric features.

In a further embodiment of the disclosure the membrane pack described above includes pleats which include peaks and valleys, the opposing membrane walls have one or more heights, and can include "M pleats", "W pleats" or a combination thereof. The pleats can also be configured as laid over pleats.

In a further embodiment of the disclosure the membrane pack described above includes a second membrane pleated with the first membrane.

In a further embodiment of the disclosure the membrane pack described above includes the polymeric features that comprise at least one purification media. Examples of purification media can include activated carbon, ion exchange, and chelating media.

Another embodiment of the disclosure includes a filter cartridge that comprises porous membranes with features as described herein and which includes a porous cylindrical core member, end caps at opposed ends of the cartridge, and, disposed around the core member and retained in the cartridge by the end caps, a pleated membrane pack of a porous membrane with features with the axes of the pleats extending generally parallel to the axis of the core member, the cylindrical pleated filter element having ends which are bonded to the end caps, a cylindrical cage surrounding the pleated filter element and sealed with it in the end cap of the cartridge; and a cylindrical cage surrounding the pleated filter element and sealed with it in the end cap of the cartridge.

Another embodiment of the disclosure includes a filter that comprises porous membranes with features described herein and which includes: a body having a cavity and a non-cylindrical shape defined by side walls; a plurality of pleat covers defining a first side channel, a first region, a center channel, a second region, and a second side channel in the cavity, each pleat cover of the plurality of pleat covers having openings; a plurality of pleat packs of porous membrane with features, the pleat packs comprising a first pleat pack positioned in the first region and a second pleat pack positioned in the second region, said first pleat pack and said second pleat pack each comprise a porous membrane with features; the membrane comprising polymeric features bonded to at least one surface of the membrane; a first end cap bonded to the body at a first end of the body, the first end cap having a first opening and a first flow passage, the first opening connected to an inlet port, the first flow passage structured for directing a fluid from the inlet port to the center channel, wherein the fluid is directed from the center channel through the first pleat pack positioned in the first region, through the second pleat pack positioned in the second region, and through the openings via parallel flows to the first side channel and the second side channel, respectively; and a second end cap bonded to the body at a second end of the body, the second end cap having a second opening and a second flow passage, the second opening connected to an outlet port, the second passage structured for directing the fluid from the first side channel and the second side channel to the outlet port.

In a further embodiment of the disclosure the filter described above includes a first pleat pack which includes a first pleated membrane, and a second pleat pack which includes a second pleated membrane, and the first pleated membrane and the second pleated membrane are made of same material or different materials.

Another embodiment of the disclosure includes a purifier cassette which includes at least the following: a purifier body that further comprises a set of media cavity sidewalls at least partially defining a media cavity, the set of media cavity sidewalls comprising a first sidewall, a second sidewall, a third sidewall and a fourth sidewall, the first sidewall opposite the second sidewall and the third sidewall opposite the fourth sidewall; one or more tension to members coupled to the first sidewall and the second sidewall of the media cavity, the one or more tension members dividing the media cavity into a plurality of sections; a pleated membrane pack comprising porous membranes with features as described herein, the pleated membrane pack disposed in the media cavity; a first purifier port fluidly connected to the media cavity; and a second purifier port fluidly connected to the media cavity.

A further embodiment of the disclosure, which includes a purifier cassette as described above, the one or more tension members run parallel to the third sidewall and fourth sidewall and divides the media cavity into a plurality of lanes.

While several exemplary articles, compositions, apparatus, method embodying aspects of the present invention have been shown, it will be understood, of course, that the invention is not limited to these embodiments. Modification may be made by those skilled in the art, particularly in light of the foregoing teachings. For example, components and features of one embodiment may be substituted for corresponding components and features of another embodiment. Further, the invention may include various aspects of these embodiments in any combination or sub combination.

While various compositions and methods are described, it is to be understood that this invention is not limited to the particular molecules, compositions, designs, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "polymeric feature" is a reference to one or more polymeric features and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some embodiments the term "about" refers to ±10% of the stated value, in other embodiments the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain embodiments thereof, other versions are possible. Therefore the spirit and scope of the appended claims should not be limited to the description and the versions contain within this specification.

The invention claimed is:

1. A porous membrane comprising:
a pleated porous membrane having pleats forming alternating peaks and valleys with opposing membrane walls interconnecting the alternating peaks and valleys of the pleats; and
at least one 3-dimensional injection molded polymeric feature formed on and bonded to a portion of at least one surface of at least one of the opposing membrane walls of the pleated porous membrane, wherein the at least one 3-dimensional injection molded polymeric feature comprises a structure formed of a polymer that is injection molded on the surface of the opposing membrane walls of the pleated porous membrane and separates the opposing walls of the pleats.

2. The porous membrane according to claim 1, wherein the at least one polymeric feature is bonded by a molecular inter-reaction between a first material of at least one polymeric feature and a second material of the porous membrane.

3. The porous membrane according to claim 2, wherein the at least one polymeric feature is bonded at a melting temperature of a lowest melting constituent of the first material and/or the second material.

4. The porous membrane according to claim 1, wherein the at least one polymeric feature and/or the porous membrane comprise a chromatographic media.

5. The porous membrane according to claim 1, wherein the at least one polymeric feature is porous.

6. The porous membrane according to claim 1, wherein the pleated porous membrane has a first surface and a second surface and wherein the polymeric features are bonded to a portion of both surfaces.

7. The porous membrane according to claim 1, wherein the pleats of the porous membrane include M pleats, W pleats, or a combination thereof.

8. The porous membrane according to claim 1, wherein the at least one 3-dimensional injection molded polymeric feature has a cone shape, a bridge shape, a pyramid shape, a hexagon shape, or an hourglass shape.

* * * * *